United States Patent
Ren et al.

(10) Patent No.: US 9,640,142 B2
(45) Date of Patent: May 2, 2017

(54) APPARATUS FOR DETECTING REGION OF INTEREST AND METHOD THEREOF

(71) Applicant: SAMSUNG ELECTRONICS CO., LTD., Suwon-si (KR)

(72) Inventors: Xianli Ren, Suwon-si (KR); Hye-rin Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 329 days.

(21) Appl. No.: 14/556,384

(22) Filed: Dec. 1, 2014

(65) Prior Publication Data

US 2015/0178949 A1 Jun. 25, 2015

(30) Foreign Application Priority Data

Dec. 19, 2013 (KR) .................. 10-2013-0159368

(51) Int. Cl.
G09G 5/02 (2006.01)
G06T 7/40 (2006.01)
G06T 7/00 (2017.01)
G06K 9/32 (2006.01)
G06K 9/36 (2006.01)

(52) U.S. Cl.
CPC ............ G09G 5/02 (2013.01); G06K 9/3233 (2013.01); G06T 7/0042 (2013.01); G06T 7/0085 (2013.01); G06K 2009/363 (2013.01); G06T 2207/20164 (2013.01); G09G 2300/026 (2013.01); G09G 2320/0233 (2013.01); G09G 2320/0242 (2013.01)

(58) Field of Classification Search
USPC ........................... 382/162, 164, 165
See application file for complete search history.

(56) References Cited

U.S. PATENT DOCUMENTS

| | | | |
|---|---|---|---|
| 5,751,362 A | 5/1998 | Lee | |
| 6,462,777 B1* | 10/2002 | Hamaguri | H04N 9/28 348/177 |
| 7,406,196 B2 | 7/2008 | Albertelli et al. | |
| 8,164,632 B2* | 4/2012 | Enami | H04N 9/3117 348/177 |
| 8,197,070 B2* | 6/2012 | Tan | G01B 11/25 353/31 |
| 8,201,950 B2* | 6/2012 | Nelson | G03B 21/00 345/1.3 |

(Continued)

FOREIGN PATENT DOCUMENTS

| | | |
|---|---|---|
| JP | 2009-128345 A | 6/2009 |
| JP | 2012-059271 A | 3/2012 |

(Continued)

*Primary Examiner* — Ishrat I Sherali
(74) *Attorney, Agent, or Firm* — Sughrue Mion, PLLC

(57) ABSTRACT

A method for detecting a region of interest (ROI) is provided, which includes acquiring a plurality of photographed images by photographing a display apparatus sequentially displaying thereon a plurality of different mono-color images, comparing gray levels of the plurality of photographed images and detecting a target region, and detecting a plurality of corner points of the target region, and detecting the region of interest (ROI) corresponding to a display screen of the display apparatus based on the plurality of corner points.

20 Claims, 17 Drawing Sheets

(56) References Cited

U.S. PATENT DOCUMENTS

| | | | |
|---|---|---|---|
| 8,400,468 B2* | 3/2013 | Nelson | H04N 9/31 |
| | | | 345/626 |
| 8,704,895 B2* | 4/2014 | Safaee-Rad | G09G 5/02 |
| | | | 348/182 |
| 9,390,646 B2* | 7/2016 | Park | G09G 3/2003 |
| 2003/0118236 A1 | 6/2003 | Kung et al. | |
| 2009/0086081 A1* | 4/2009 | Tan | G01B 11/25 |
| | | | 348/333.1 |
| 2011/0050887 A1* | 3/2011 | Nelson | H04N 9/31 |
| | | | 348/135 |
| 2012/0062736 A1 | 3/2012 | Xiong | |
| 2012/0249554 A1* | 10/2012 | Chen | G06K 9/00979 |
| | | | 345/428 |

FOREIGN PATENT DOCUMENTS

| | | |
|---|---|---|
| KR | 10-0171120 B1 | 3/1999 |
| KR | 10-1150754 B1 | 6/2012 |

\* cited by examiner

FIG. 5A
FIG. 5B
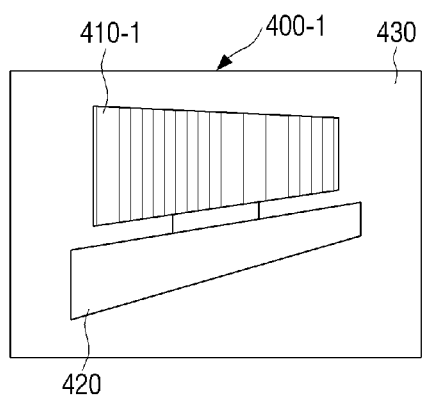
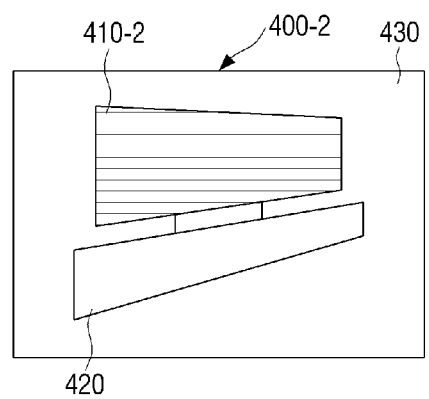

APPARATUS FOR DETECTING REGION OF INTEREST AND METHOD THEREOF

CROSS-REFERENCE TO RELATED APPLICATIONS

This application claims priority from Korean Patent Application No. 10-2013-0159368, filed on Dec. 19, 2013, in the Korean Intellectual Property Office, the disclosure of which is incorporated herein by reference in its entirety.

BACKGROUND

1. Field

Apparatuses and methods consistent with the exemplary embodiments relate to detecting a region of interest (ROI), and more particularly, to an apparatus for detecting a ROI by detecting corner points based on the chrominance of a target region, and a method thereof.

2. Description of the Related Art

A display device provides an image for viewing by a user, after processing an image signal provided from an input source such as a personal computer (PC) into a viewable form, and can be implemented as a variety of devices such as a television (TV), a monitor, a portable media player, or the like.

When used for professional purposes, the display apparatus, such as a broadcasting display apparatus, a large format display (LFD) apparatus, or a medical display apparatus has to display incoming images in a color format that is required by the user to meet increasing demands by the user to view clearer and higher definition images.

For example, business or public institutions often install wide screen display apparatuses indoors or outdoors for the purpose of displaying advertisements or promotions. This wide screen display apparatus uses one display panel, or a plurality of adjacent display panels which constitute a video wall. In the case of using a plurality of display panels, color difference is generated between displayed screens on the plurality of display panels. To address the problem, the display apparatus performs color calibration which means that the output characteristics of the display apparatus are set to meet a defined standard or the needs of the user.

The related color calibration method requires a user to perform color calibration for each of the plurality of display panels, which takes a lengthy time. Additionally, the calibration work is restricted by the space where the display panels are installed.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

According to an exemplary embodiment, there is provided an apparatus for detecting a region of interest (ROI) by detecting corner points based on the chrominance of a target region, and a method thereof.

According to an aspect of the exemplary embodiment, a method for detecting a region of interest (ROI) is provided. The method may include acquiring a plurality of photographed images or test images by photographing a display apparatus which sequentially displays thereon a plurality of different mono-color images, comparing gray levels of the plurality of test images and detecting a target region, detecting a plurality of corner points of the target region, and detecting the region of interest (ROI) corresponding to a display screen of the display apparatus based on the plurality of corner points.

The method may include providing the plurality of mono-color images to the display apparatus in a sequential order.

The display apparatus may include at least one display panel, and the plurality of test images comprise the plurality of mono-color images to be displayed on respective corner regions of the display screen.

The display apparatus may be a multi-display system comprising a plurality of display panels, and the method for detecting the ROI may additionally include generating the plurality of mono-color images that correspond to at least some of the plurality of display panels.

The plurality of test images may respectively include the plurality of mono-color images to be exclusively displayed on the respective corner regions of the entire display screen which is formed by at least two continuously-arranged display panels among the plurality of display panels.

The plurality of test images may respectively include the plurality of mono-color images to be displayed on the respective corner regions of the entire display screen which is formed by at least two discontinuously-arranged display panels among the plurality of display panels.

The detecting the plurality of corner points may include acquiring a resultant image by subtracting gray levels of the plurality of test images based on respective pixel units, detecting the target region based on a region that has a preset gray level in the resultant image, and sequentially comparing the respective pixel values within the target region with adjacent pixel values, and detecting the plurality of corner points based on the points that have pixel value changes exceeding the corner threshold.

The plurality of corner points may be detected based on the Harris corner detection algorithm, and the detecting the plurality of corners may include detecting a plurality of corner candidate points based on areas of the target region whose pixel value changes exceed the corner threshold, and detecting the plurality of corner points based on the plurality of detected corner candidate points. The detecting the plurality of corner candidate points may include scaling-down the corner threshold when the number of the plurality of detected corner candidate points does not exceed the preset number of corner candidate points.

The method may additionally include determining a result of subtracting gray levels of the plurality of test images based on a plurality of components and performing computation based on respective pixel units within the target region, and excluding pixel regions from the target region when the pixel regions have the plurality of components which are uniformly greater than 0 or smaller than 0 based on the result of the subtraction.

According to another aspect of the exemplary embodiment, an apparatus for detecting a region of interest (ROI) is provided. The apparatus may include an input configured to receive a plurality of photographed images or test images of a display apparatus sequentially displaying thereon a plurality of different mono-color images, and a controller configured to compare gray levels of the plurality of photographed images and detect a target region, and based on a plurality of corner points of the target region, detect the region of interest (ROI) corresponding to a display screen of the display apparatus based on the plurality of corner points.

The apparatus may additionally include an image processor configured to generate the plurality of mono-color images, and a communicator configured to provide the plurality of mono-color images to the display apparatus in a sequential order.

The apparatus may additionally include a camera configured to photograph the display apparatus and generate the test images. After the plurality of mono-color images are respectively transmitted to the display apparatus, the controller may control the camera to perform photographing regarding the plurality of mono-color images.

The display apparatus may include one display panel, and the plurality of test images may respectively include the plurality of mono-color images to be displayed exclusively on the respective corner regions of the display screen.

The display apparatus may be a multi-display system comprising a plurality of display panels, and the controller may control the image processor to generate the plurality of mono-color images that correspond to at least some of the plurality of display panels.

The controller may control the image processor to generate the plurality of mono-color images to be displayed on the respective corner regions of the entire display screen which is formed by at least two continuously-arranged display panels among the plurality of display panels.

The controller may control the image processor to generate the plurality of mono-color images to be displayed on the respective corner regions of the entire display screen which is formed by at least two discontinuously-arranged display panels among the plurality of display panels.

The controller may acquire a resultant image by subtracting gray levels of the plurality of test images based on respective pixel units of the target region, detect the target region based on a region that has a preset gray level in the resultant image, and sequentially compare the respective pixel values within the target region with adjacent pixel values, and detect the plurality of corner points based on the points that have pixel value changes exceeding the corner threshold.

The plurality of corner points may be detected based on the Harris corner detection algorithm, and the controller may detect a plurality of corner candidate points based on the points whose pixel value changes exceed the corner threshold, detect the plurality of corner points based on the plurality of detected corner candidate points, and scale-down the corner threshold when the number of the plurality of detected corner candidate points does not exceed the preset number of corner candidate points.

The controller may determine a result of subtracting gray levels of the plurality of test images based on a plurality of components and perform computation based on respective pixel units of the target region, and exclude pixel regions from the target region when the pixel regions have the plurality of components which are uniformly greater than 0 or smaller than 0 based on the result of the subtraction.

According to the various exemplary embodiments, ROI can be more accurately detected, because influence from the background region is reduced.

BRIEF DESCRIPTION OF THE DRAWINGS

The above and/or other aspects will be more apparent by describing certain exemplary embodiments with reference to the accompanying drawings, in which:

FIGS. 5A to 7 illustrate a process of detecting a ROI according to an exemplary embodiment;

FIGS. 8A to 11 illustrate a process of detecting a ROI according to another exemplary embodiment;

DETAILED DESCRIPTION OF EXEMPLARY EMBODIMENTS

Figure 1:
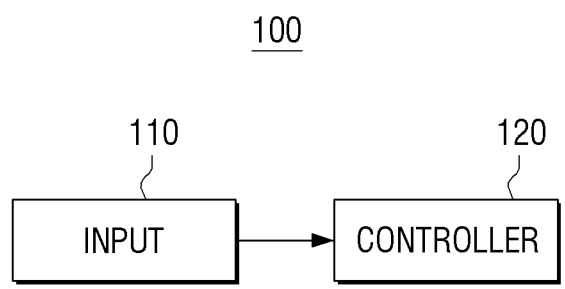
FIG. 1 is a block diagram of an apparatus for detecting a region of interest (ROI) according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the exemplary embodiments. Accordingly, it is apparent that the exemplary embodiments can be carried out without those specifically defined matters. Also, well-known functions or constructions are not described in detail since they would obscure the exemplary embodiments with unnecessary detail.

FIG. 1 is a block diagram of an apparatus for detecting a region of interest (ROI) according to an exemplary embodiment.

Referring to FIG. 1, the ROI detecting apparatus 100 may be implemented in a variety of user terminal forms such as a PC, a laptop computer, a mobile phone, or a tablet PC, but is not limited thereto. That is, the ROI detecting apparatus 100 may be implemented as an apparatus to professionally perform calibration on the picture quality of the display panel 310.

Referring to FIG. 1, the ROI detecting apparatus 100 includes an input 110 and a controller 120.

Figure 2:
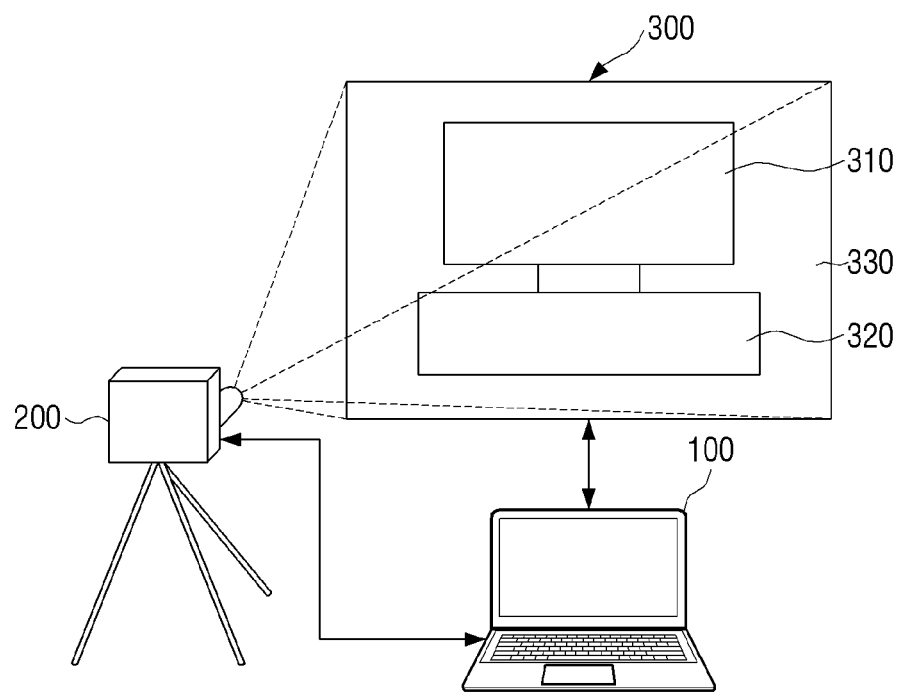
FIG. 2 is a block diagram of a system for detecting a region of interest (ROI) according to an exemplary embodiment.

The input 110 receives an image photographed by a camera 200 (FIG. 2). In this case, the photographed image 300 may be an image that is obtained by photographing an image displayed on an external display apparatus. That is, the camera 200 may photograph a display apparatus which is currently displaying an image, and the input 110 may receive the image photographed by the camera 200.

The input 110 may receive a plurality of photographed images in sequence. The plurality of successively photographed images may be images which are obtained by photographing a display apparatus displaying different images thereon. That is, the input 110 may receive a first photographed image 300 which is an image which is obtained by photographing a display apparatus displaying a first image, and a second photographed image 300a (not shown) which is an image which is obtained by photographing the display apparatus displaying a second image.

The input 110 may receive a plurality of test images which are successively photographed. In this example, the plurality of test images may include different mono-color images. Accordingly, the input 110 may receive a first test image which is an image obtained by photographing a display apparatus displaying a first mono-color image, and a second test image which is an image obtained by photographing the display apparatus displaying a second mono-color image thereon.

The controller 120 may calculate gray levels for each of the plurality of test images received sequentially from the input 110. The calculated gray levels may be converted into data for computation thereof. The gray level is a numerical representation of a displayed color, which is divided into, for example, 0 to 255 levels in 8-bit color mode. Accordingly, because the plurality of test images received at the input 110 have different mono-color images, these have different gray levels.

The controller 120 compares the gray levels of the plurality of photographed images 300 as received at the input 110. Accordingly, the controller 120 may calculate a difference between the gray level of the first photographed image 300 and the gray level of the second photographed image 300a. Depending on the difference of the gray levels, the controller 120 may detect a target region. In one example, the controller 120 may set a target region when this region is the pixel region having a difference of gray levels exceeding a preset value, while setting a background region 330 when the background region is the pixel region having a difference of gray levels below the preset value.

Likewise, when the input 110 receives a plurality of test images, the controller 120 may generate an image, representing a result of calculating a difference of gray levels of the plurality of received test images. Accordingly, using the plurality of test images, the controller 120 may distinguish an image into the background region 330 and target region.

The controller 120 may then detect corner points of the target region. The 'corner point' as used herein refers to the point that can be detected by the Harris corner detection algorithm, in which one target region may have a plurality of corner points.

The controller 120 may detect a ROI based on a plurality of detected corner points. Because one target region can have a plurality of corner points, the controller 120 may connect the plurality of corner points and determine a ROI based on a region defined by the connected corner points. For example, when three corner points are detected for one target region, the ROI may be a triangular region that is defined by connecting the three detected corner points. Likewise, when four corner points are detected for one target region, the ROI may be a rectangular region that is defined by connecting the four detected corner points. In the manner explained above, the controller 120 may determine a ROI that corresponds to the display screen of the display apparatus.

FIG. 2 is a block diagram of a system for detecting a ROI according to an exemplary embodiment. Referring to FIG. 2, the ROI detecting system according to an exemplary embodiment includes a display apparatus, a camera 200 and a ROI detecting apparatus 100.

The display apparatus may include a display panel 310, and a panel support 320. The display panel 310 may display visual information to a user, and the panel support 320 may be so configured as to support the display panel 310. The display apparatus may not include the panel support 320, like the example of a wall-mounted TV.

The camera 200 may photograph the display apparatus or the display apparatus and the background 330 of the display apparatus. The camera 200 may photograph an image displayed by the display panel 310, when the display panel 310 is displaying image thereon. Accordingly, the camera 200 may photograph an image displayed on the display panel 310 and/or the background 330 thereof, and may transmit the photographed image to the ROI detecting apparatus 100. The camera 200 may preferably be fixed by a fixation device.

The ROI detecting apparatus 100 may be connected to the display apparatus by wired means or in a wireless manner, and controls the operation of the display panel 310. The ROI detecting apparatus 100 may transmit a signal to the display apparatus to cause the display apparatus to display the first mono-color image. Accordingly, when the display apparatus displays the first mono-color image, the ROI detecting apparatus 100 may control the camera 200 to photograph the display apparatus displaying thereon the first mono-color image.

The ROI detecting apparatus 100 may then transmit a signal to the display apparatus, which causes the display apparatus to display a second mono-color image. When the display apparatus displays the second mono-color image accordingly, the ROI detecting apparatus 100 may control the camera 200 to photograph the display apparatus displaying the second mono-color image thereon.

The ROI detecting apparatus 100 may be connected to the camera 200 in a wired or wireless manner. The ROI detecting apparatus 100 may be connected to the camera 200 to control the overall operation of the camera 200. The ROI detecting apparatus 100 may transmit a signal to the camera 200, which causes the camera 200 to acquire a first test image. In this case, the camera 200 may photograph the first test image when the display panel 310 displays the first mono-color image thereon, and thus acquire the first test image. Accordingly, the camera 200 may transmit the acquired first test image to the ROI detecting apparatus 100.

After that, the ROI detecting apparatus 100 may transmit a signal to the camera 200, which causes the camera 200 to acquire the second test image. Accordingly, the camera 200 may photograph the second test image when the display panel 310 displays the second mono-color image thereon, and thus acquire the second test image. As a result, the camera 200 may transmit the acquired second test image to the ROI detecting apparatus 100.

A method for detecting a ROI from the received photographed image 300 and detecting a ROI of the target region will be explained below.

Referring to FIG. 2, the ROI detecting apparatus 100 and the camera 200 may be separated from each other (see FIG. 2). However, this arrangement of the ROI detecting apparatus and the camera 200 is not limited thereto. Accordingly, the camera 200 may be built into the ROI detecting apparatus 100, which will be explained in detail below with reference to FIGS. 3 and 4.

Figure 3:
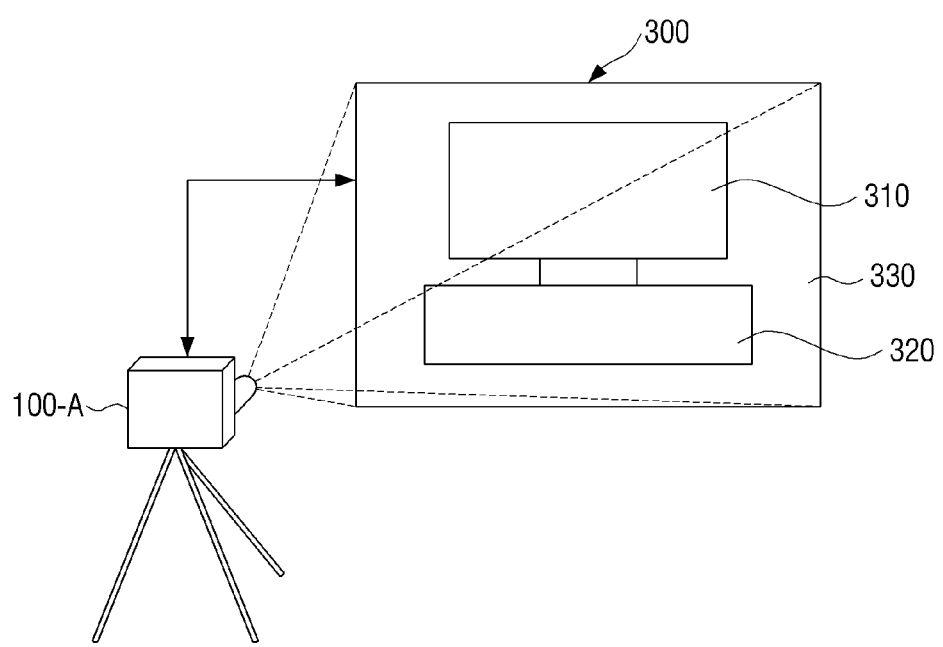
FIG. 3 is a block diagram of a system for detecting a region of interest (ROI) according to another exemplary embodiment.

FIG. 3 is a block diagram of a ROI detecting system according to another exemplary embodiment. Referring to FIG. 3, a ROI detecting apparatus 100-A including a built-in camera will be explained. The ROI detecting system according to another exemplary embodiment may include a display apparatus and a ROI detecting apparatus 100-A.

The display apparatus may include a display panel 310 and a panel support 320. The overlapped elements of the display apparatus that have been explained above will not be redundantly explained for the sake of brevity, but referenced to the explanation provided above.

The ROI detecting apparatus 100-A may photograph the display apparatus or photograph the display apparatus and the background thereof. The ROI detecting apparatus 100-A may photograph an image displayed by the display panel 310, when the display panel 310 is displaying image thereon. The ROI detecting apparatus 100-A may preferably be fixed by a fixation device.

The ROI detecting apparatus 100-A may be connected to the display apparatus by wired means or in a wireless manner, and controls the operation of the display panel. The ROI detecting apparatus 100-A may transmit a signal to the display apparatus to cause the display apparatus to display the first mono-color image. Accordingly, when the display apparatus displays the first mono-color image, the ROI detecting apparatus 100-A may photograph the display apparatus displaying thereon the first mono-color image. As a result, the ROI detecting apparatus 100-A may acquire the first test image by photographing the display apparatus displaying the first mono-color image thereon.

The ROI detecting apparatus 100-A may then transmit a signal to the display apparatus, which causes the display apparatus to display a second mono-color image. When the display apparatus displays the second mono-color image accordingly, the ROI detecting apparatus 100-A may photograph the display apparatus displaying the second mono-color image thereon. Accordingly, the ROI detecting apparatus 100-A may acquire the second test image by photographing the display apparatus displaying the second mono-color image thereon.

After that, the target region of the photographed image 300 may be detected and the ROI of the target region may be detected in the manner explained above. Hereinbelow, the ROI detecting apparatus 100-A according to another exemplary embodiment will be explained in detail.

Figure 4:
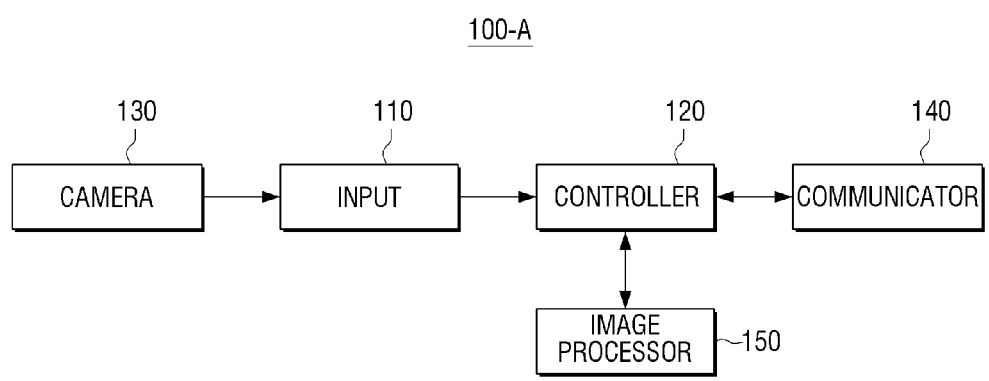
FIG. 4 is a block diagram of an apparatus for detecting a region of interest (ROI) according to another exemplary embodiment.

FIG. 4 is a block diagram of a ROI detecting apparatus 100-A according to another exemplary embodiment. Referring to FIG. 4, the ROI detecting apparatus 100-A may include a camera 130, an input 110, a controller 120, a communicator 140, and an image processor 150. The exemplary embodiment will be explained hereinbelow, while the overlapping elements or operations will not be redundantly explained for the sake of brevity.

The image processor 150 generates a plurality of mono-color images in a sequential manner. The plurality of generated mono-color images are respectively transmitted to the display apparatus via the communicator 140.

The 'mono-color image' as used herein may be a reference image of a plurality of components representing gray levels. For example, in a color mode of 8-bit gray level, an image may be expressed in (R, G, B) which is divided into 256 levels (i.e., 0 to 255 level). Accordingly, RED may be expressed as (255. 0, 0), GREEN is (0, 255, 0), BLUE is (0, 0, 255), and CYAN is (0, 255, 255), respectively, and each image may be a mono-color image, as this can have 0 or 255 value for at least one expression component. Accordingly, in addition to the R, G, B mentioned above, an image may be a mono-color image, when this has at least one gray level component that is 0 or 255.

The communicator 140 is provided to perform communication with the display apparatus. The communicator 140 may be connected to the display apparatus by a wired manner via a USB interface or other serial interfaces. The communicator 140 may also be connected by a wireless communication interface such as WiFi, Bluetooth, Near Field Communication (NFC), Zigbee, 3G or 4G.

The image processor 150 that sequentially generates a plurality of mono-color images may send plurality of mono-color images to the communicator 140, and the communicator 140 may send the plurality of mono-color images to the display apparatus sequentially. That is, when the image processor 150 generates the first mono-color image, the communicator 140 may transmit the first mono-color image to the display apparatus. Accordingly, the display apparatus may display the first mono-color image. After that, when the image processor 150 generates second mono-color image, the communicator 140 may transmit the second mono-color image to the display apparatus. Accordingly, the display apparatus may display the second mono-color image.

The image processor 150, the communicator 140 and the display apparatus may send out or receive a plurality of images therebetween. That is, the image processor 150 may generate the first and second mono-color images in sequence, and transmit the first and second mono-color images to the communicator 140, in which case additional data may be transmitted along, indicating a sequence in which the first and second mono-color images are generated. The communicator 140 may transmit the first and second mono-color images, and also the data indicating the sequence of generating the first and second mono-color images to the display apparatus. Accordingly, the display apparatus may display the first mono-color image first, and then display the second mono-color image, based on the data indicating the sequence of generating the images.

The camera 130 may photograph the display apparatus and generate test images. Because the display panel is displaying an image thereon, the controller 120 may control the camera 130 to photograph the image displayed by the display panel. The controller 120 may particularly control the camera 130 to photograph a mono-color image displayed on the display panel and acquire a test image, when the display panel displays the mono-color image. Accordingly, the camera 130 may transmit the test image (i.e., mono-color image as photographed) to the input 110.

For example, when the image processor 150 generates a first mono-color image, the camera 130 photographs the first mono-color image which is generated by the display apparatus under control of the controller 120, to thus acquire the first test image. The first test image is transmitted to the controller 120 via the input 110. After that, when the image processor 150 generates a second mono-color image, the camera 130 may acquire a second test image, by photographing the second mono-color image which is generated by the display apparatus under control of the controller 120. The second test image is transmitted to the controller 120 via the input 110.

Accordingly, the ROI detecting apparatus 100-A acquires the first and second test images sequentially. Hereinbelow, a method for detecting target region and ROI based on the first and second acquired test images will be explained with reference to FIGS. 5 to 7.

FIG. 5A illustrates the first test image 400-1 and FIG. 5B illustrates the second test image 400-2.

FIG. 5A illustrates the first test image 400-1 which is a photographed image of a display apparatus displaying first mono-color image. The first test image 400-1 may include not only the image of the display panel 410-1, but also an image of the panel support 420 supporting the display panel 410-1 and background 430 of the display apparatus. Because the first mono-color image is displayed only on the display panel, the first test image 400-1 may include the first mono-color image in the area 410-1 that corresponds to the display panel.

FIG. 5B illustrates the second test image 400-2 which is a photographed image of a display apparatus displaying the second mono-color image. As explained above, since the second mono-color image is displayed only on the display panel, the second test image 400-2 may include the second mono-color image in the area 410-2 that corresponds to the display panel.

Figure 6:
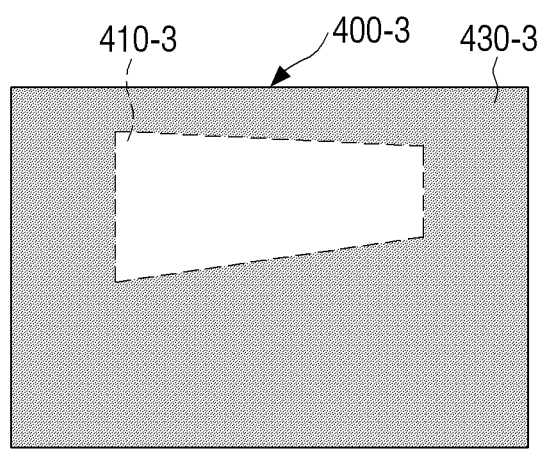

FIG. 6 illustrates a resultant image 400-3 which may be a result of computing gray levels of the first and second test images 400-1, 400-2 based on a pixel unit.

First, the controller 120 acquires a plurality of photographed images. The plurality of photographed images may be test images that are sequentially acquired. Accordingly, the controller 120 may acquire the first and second test images 400-1, 400-2 sequentially, and acquire image 400-3 which is a result of comparing gray levels of the first and second test images 400-1, 400-2.

The controller 120 may remove a first noise The first noise may be a noise of an image signal which may appear between the first and second test images 400-1, 400-2 according to minute movement of the ROI detecting apparatus 100-A or the camera which photographs the display panel. That is, to maintain stability of an image, the controller 120 removes noise, according to which regions with similar pixels are smoothed and edges of the objects are maintained. A bilateral filter may be used in the noise removal process (see C. Tomasi and R. Manduchi, "Bilateral Filtering for Gray and Color Images", In proc of the 1998 IEEE International Conference on Computer Vision, Bombay, India, pp. 839-846, 1998). However, the above are provided only for illustrative purpose, and therefore, a variety of noise removal methods may be used, including mean filtering, or linear smoothing filtering.

Accordingly, the first noise may be removed.

The controller 120 may acquire a resultant image 400-3 which is a result of comparing gray levels of a plurality of test images (i.e., photographed images) with respect to each pixel. The resultant image 400-3 may represent a result of comparing gray levels of a plurality of test images with respect to each pixel, and subtracting the gray levels of the plurality of test images based on each pixel unit. For example, for an image expressed by (R, G, B) which is divided into 256 levels from 0 to 255 in the color mode of 8-bit gray level, the result of subtracting gray levels of the first test image and the second test image for each pixel may be expressed by:

$$\text{Image1}_{RGB} - \text{Image2}_{RGB} = (\Delta R, \Delta G, \Delta B) \quad \text{[Mathematical Expression 1]}$$

The controller 120 may remove the second noise. The second noise may be the noise of an image signal which may appear between the first and second test images 400-1, 400-2 due to an abrupt change in the image on a non-display panel area. That is, it may be assumed that the second noise is generated, when a certain area of the background included in the first test image 400-1 is abruptly brightened or darkened in the second test image 400-2.

First, the controller 120 expresses a plurality of gray level components based on results of subtraction of the gray levels for a plurality of test images and calculates each pixel unit. Referring to [Mathematical Expression 2], the controller 120 expresses the results of subtracting gray levels for the first and second test images 400-1, 400-2 into ($\Delta R$, $\Delta G$, $\Delta B$).

After that, the controller 120 may exclude the pixel regions from the target region, when the plurality of gray level components of the calculated results of subtraction of the pixel regions are greater than, or smaller than 0. That is, as represented by Mathematical Expression 2 below, when the respective gray level components of ($\Delta R$, $\Delta G$, $\Delta B$), which are the results of the subtraction of the gray levels of the first and second test images 400-1, 400-2, uniformly have positive values or negative values, it is considered that the corresponding region does not have a change in the pixel level.

$$(\Delta R, \Delta G, \Delta B) = \quad \text{[Mathematical Expression 2]}$$
$$\begin{cases} (0, 0, 0) & \text{if } (+, +, +) \text{ or } (-, -, -) \\ (\Delta R, \Delta G, \Delta B) \end{cases}$$

For example, against a same background region, the gray level of the background region 430 of the first test image 400-1 may be expressed as (100, 100, 100), while the gray level of the background region 430 of the second test image 400-2 may be expressed as (240, 240, 240). This suggests that noise is generated, i.e., that a certain background region is unintentionally brightened abruptly while the change in gray level is supposed to occur only with respect to the display panel. Accordingly, the differences of gray levels in the corresponding regions are (−140, −140, −140), and because the differences uniformly have negative values, by [Mathematical Expression 2], it is considered that the pixel level of the corresponding regions do not have any change.

In another example, against the same background region, the gray level of the background region 430 of the first test image 400-1 may be expressed as (100, 100, 100), while the gray level of the background region 430 of the second test image 400-2 may be expressed as (10, 10, 10). This suggests that noise is generated, i.e., that a certain background region is unintentionally darkened abruptly while the change in gray level is supposed to occur only with respect to the display panel. Accordingly, the differences of gray levels in the corresponding regions are (+140, +140, +140), and because the differences uniformly have positive values, by [Mathematical Expression 2], it is considered that the pixel level of the corresponding regions do not have any change.

Accordingly, the second noise can be removed in the manner explained above.

After removing the first and second noises in the manner explained above, the controller 120 may acquire a resultant image 400-3 which is a result of subtracting the first and second test images 400-1, 400-2. The subtraction of the first and second test images 400-1, 400-2 may be expressed by $$\text{Color Difference} = \left| \begin{array}{c} \text{Image1}_{RGB} - \\ \text{Image2}_{RGB} \end{array} \right| \quad \text{[Mathematical Expression 3]}$$
$$= |(\Delta R, \Delta G, \Delta B)|$$

That is, the difference of gray level between the first and second test images 400-1, 400-2 may represent an absolute value of a difference value of respective gray level components.

In the above example, the ROI detecting apparatus 100-A controls so that the first and second mono-color images are sequentially displayed on the display panel only, while the ROI detecting apparatus 100-A does not control gray changes. That is, because only the color image region that corresponds to the display panel has a difference in gray levels between the first and second test images 400-1, 400-2, there is no difference of gray levels in the other region, i.e., in the background region. Accordingly, the difference of gray levels can be 0 in the background region 430-3, as can be represented by:

Color Difference=
(0,0,0)|$_{on\ Background\ area}$ [Mathematical Expression 4]

Further, because the ROI detecting apparatus 100-A controls so that the first and second mono-color images are sequentially displayed only on the display panel, it is only a color image region corresponding to the display panel that has a difference in gray levels between the first and second test images 400-1, 400-2. For example, when the first and second mono-color images are RED(255, 0, 0) and CYAN (0, 255, 255), respectively, the difference of gray levels in the color image region can be expressed by:

Color Difference = |RED$_{RGB}$ − CYAN$_{RGB}$| [Mathematical Expression 5]

= |(255, 0, 0) − (0, 255, 255)|

= |(255, −255, −255)|

= (255, 255, 255)|$_{on\ color\ pattern\ area}$

As explained above, in the background region 430-3, the difference of gray levels is calculated to be (0, 0, 0) (according to [Mathematical Expression 4]), while the difference of gray levels is calculated to be (255, 255, 255) (according to [Mathematical Expression 5]) in the color image region 410-3. Accordingly, referring to FIG. 6, the resultant image 400-3 may be divided into the background region 430-3 expressed as Black(0, 0, 0), and the color image region 410-3 expressed as White(255, 255, 255).

After that, the controller 120 may convert the resultant image into a gray level. The controller 120 may detect the resultant image as the target region 410-3 when a certain region in the resultant image has a preset gray level. Accordingly, the controller may detect the target region 410-3 based on a color image region expressed as White(255, 255, 255).

Accordingly, the target region 410-3 is detected in the manner explained above.

Hereinbelow, a method for detecting corner points of the detected target region, and a method for detecting ROI with the detected corner points, will be explained.

Figure 7:
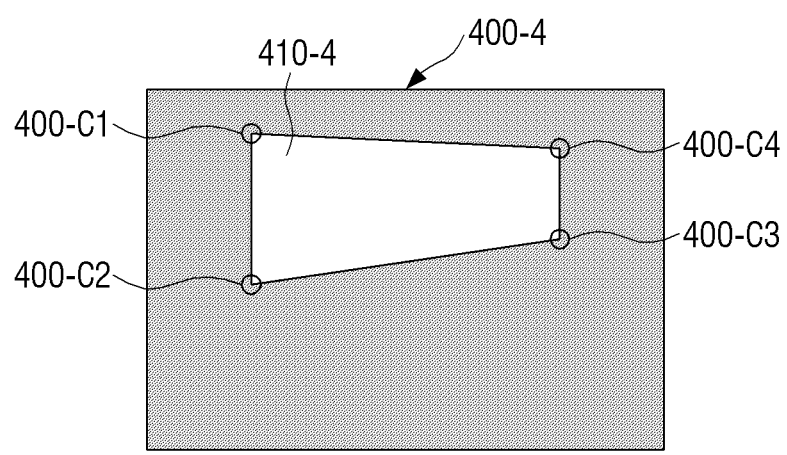
Figure 8:
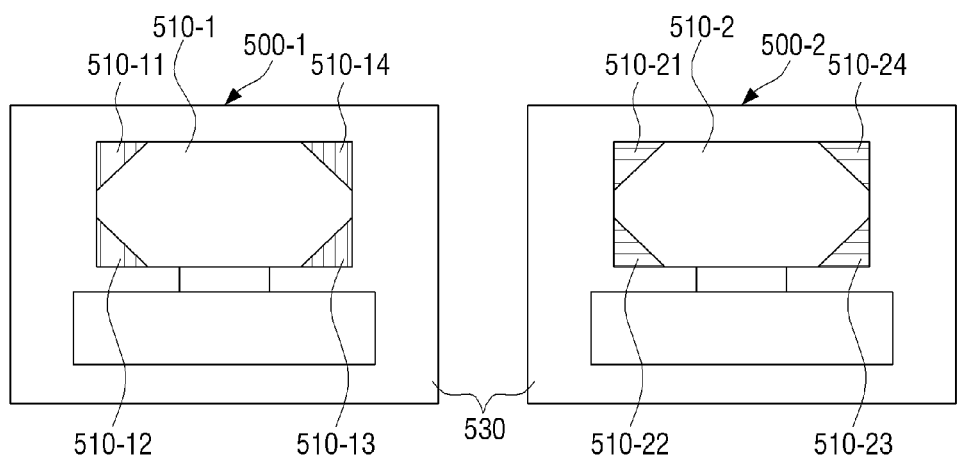

FIG. 7 illustrates a ROI which is detected based on a plurality of corner points.

Referring to FIG. 7, a plurality of corner points may be detected according to the Harris corner detection algorithm. The Harris corner detection algorithm moves a small window up, down, left and right, while analyzing a change in pixel values and make a determination accordingly. That is, according to the Harris corner detection algorithm, the corner points are defined as those points where the pixel values within a defined window of an image abruptly change up, down, left and right (see "A combined corner and edge detector", Proceedings of the 4th Alvey Vision Conference, pp. 147-151, 1988).

The Harris corner detection algorithm is as expressed by [Mathematical Expression 6] and [Mathematical Expression 7]. In [Mathematical Expression 6], w(x, y) denotes the window function, I is pixel value, (ΔR, ΔG, ΔB) are converted gray level data from the resultant image, and M is expressed in a matrix form.

$$M = \sum_{x,y} w(x, y) \begin{bmatrix} \left(\frac{\partial i}{\partial x}\right)^2 & \frac{\partial i}{\partial x}\frac{\partial i}{\partial y} \\ \frac{\partial i}{\partial x}\frac{\partial i}{\partial y} & \left(\frac{\partial i}{\partial y}\right)^2 \end{bmatrix}$$ [Mathematical Expression 6]

where, $\begin{cases} w(x, y): \text{window function} \\ I: \text{Pixel value} \end{cases}$ The controller 120 sequentially compares the respective pixel values within the target region 410-3 with the adjacent pixel values, and may detect a plurality of corner points based on the points where the pixel changes exceed a corner threshold. The corner response function according to the Harris corner detection algorithm may be expressed by [Mathematical Expression 7], and the result of the corner response function can correspond to a corner score or a pixel change of one pixel. Det(M) denotes determinant of matrix (M), k is constant, and traceM may be a trace of matrix (M).

$R=Det(M)-k(traceM)^2$ [Mathematical Expression 7]

According to [Mathematical Expression 7], the controller 120 may detect a certain pixel to be a corner point when the certain pixel has a pixel value change exceeding a preset threshold, or determine that the pixel is not a corner point when the certain pixel has a pixel value change below the preset threshold. That is, referring to FIG. 7, the controller 120 may detect first to fourth corner points (400-C1~400-C4) which have pixel value changes exceeding the preset threshold. Accordingly, the controller 120 may connect the first to fourth detected corner points (400-C1~400-C4), and detect a region of interest (ROI) 410-4 based on the space defined within the connected corner points The controller 120 may generate a second corner threshold, which is scaled down from the first corner threshold, when the pixel value change is less than the first preset corner threshold. Accordingly, the controller 120 may detect a plurality of corner points by comparing the pixel value change with the second corner threshold. This will be explained in detail below with reference to FIG. 17.

FIGS. 8A to 11 illustrate a process of detecting a ROI according to different examples of an exemplary embodiment. The similar or overlapping elements or operations as the operations of FIGS. 5A to 7 will not be redundantly explained below for the sake of brevity.

Referring to FIGS. 8A and 8B, the display apparatus may include one display panel, and the controller 120 may control so that a mono-color image is displayed only on the respective corner regions of one display screen. In this example, the four corner regions of the display screen may be in a triangular shape and these four corner regions may sequentially display the first and second mono-color images, sequentially.

FIG. 8A illustrates a first test image 500-1 which is a photographed image of a display apparatus displaying thereon a first mono-color image, in which the first test image 500-1 includes first to fourth corner regions 510-

11~510-14. FIG. 8B illustrates a second test image 500-2 which is a photographed image of a display apparatus displaying thereon a second mono-color image, in which the second test image 500-2 includes first to fourth corner regions 510-21~510-24. Accordingly, each of the plurality of test images includes a plurality of mono-color image regions that are displayed only on the corner regions of the display screen.

Figure 9:
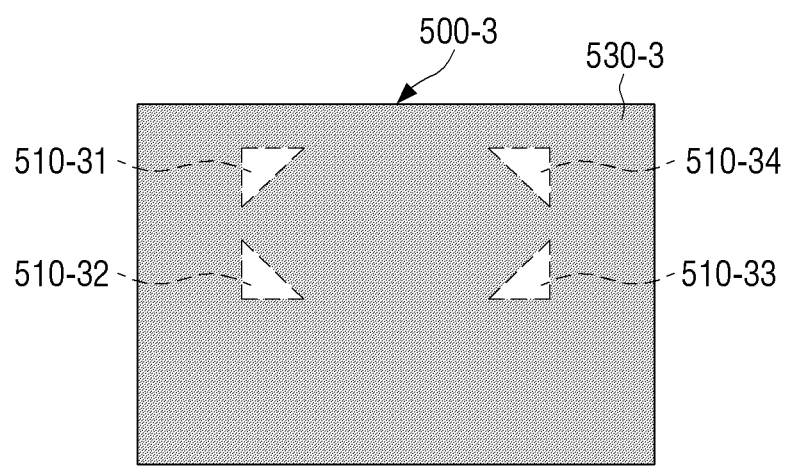

FIG. 9 illustrates a resultant image 500-3 which may be a result of computing the gray levels of the first and second test images 500-1, 500-2 based on pixel units. This will not be redundantly explained below, but referenced to the explanation provided above with reference to FIG. 6 except for the following.

That is, FIGS. 8A and 8B particularly illustrate an example in which a plurality of test images each includes a plurality of mono-color image regions which are displayed only on the respective corner regions of the display screen, in which case the target regions 510-31~510-34 may correspond to the four corner regions. Referring to FIG. 9, the resultant image 500-3 may be divided into four color image regions 510-31~510-34 expressed by gray levels of White (255, 255, 255) and background region 530-3 expressed as gray levels of Black(0, 0, 0).

Accordingly, the target region may be detected in the manner explained above. Hereinbelow, a method for detecting corner points of the detected target region, and a method for detecting ROI with the detected corner points will be explained.

Figure 10:
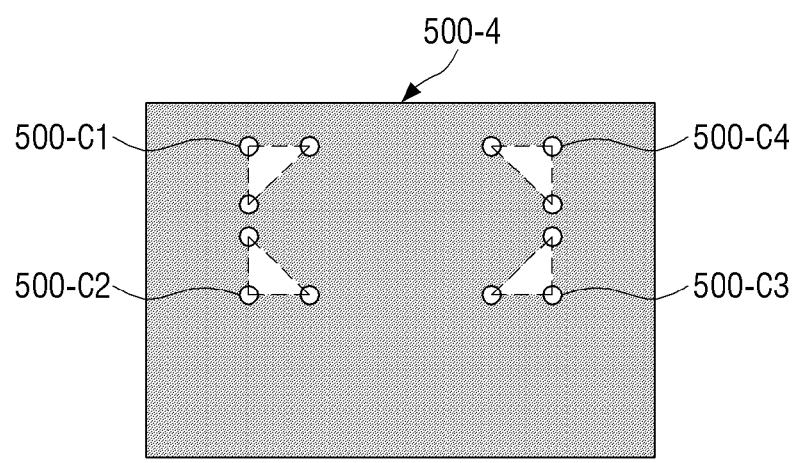
Figure 11:
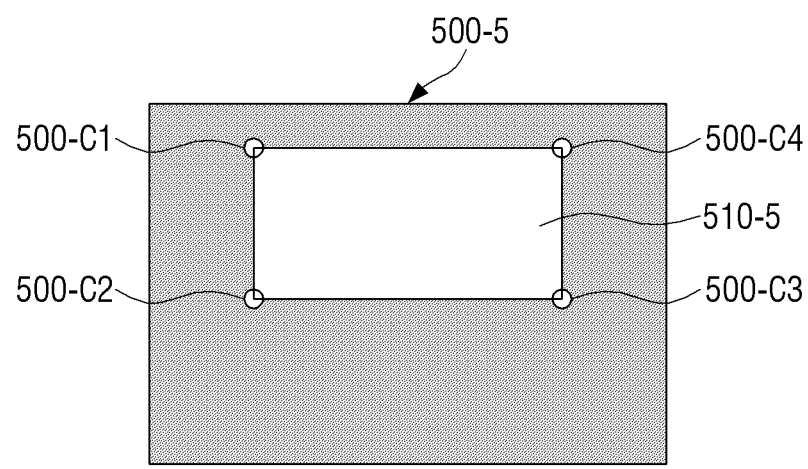

FIG. 10 illustrates a plurality of corner candidate points as detected. The corner candidate points can be detected in the same manner as the one employed above (see FIG. 7) to detect the corner points. Accordingly, a redundant explanation will be omitted for the sake of brevity, except for the following.

That is, because FIGS. 8A and 8B illustrate an example where a plurality of test images each includes a plurality of mono-color image regions to be displayed only on the respective corner regions of the display screen, the corner candidate points may be detected in a manner illustrated in FIG. 10. Accordingly, three corner candidate points may be detected in the first target region 510-31. Likewise, three corner candidate points can be detected in each of the second to fourth target regions 510-32~510-34.

In the particular example illustrated in FIGS. 8A and 8B where a plurality of test images each includes a plurality of mono-color image regions to be displayed only on the respective corner regions of the display screen, four target regions 510-31~510-34 are detected. Accordingly, in order to detect one target region, it is necessary to detect one corner point among the corner candidate points. In this example, among the target regions in the triangular shapes, the point that corresponds to right angle portion may be the corner point. Accordingly, the corner candidate point that corresponds to the right angle portion may be detected as the first corner point 500-C1 in the first target region 510-31. Likewise, the second corner point 500-C2 may be detected in the second target region 510-32, the third corner point 500-C3 may be detected in the third target region 510-33, and the fourth corner point 500-C4 may be detected in the fourth target region 510-34. That is, four corner points 500-C1~500-C4 may be detected in one resultant image 500-4.

After that, the ROI may be detected as the four detected corner points 500-C1~500-C4 are connected. That is, referring to FIG. 11, the controller 120 may connect the first to fourth corner points 500-C1~500-C4 and detect the ROI 510-5 based on a space defined within the connected corner points 500-C1~500-C4.

Accordingly, since the ROI is detected by detecting a plurality of target regions corresponding to the respective corner regions of one display screen, influence from the surrounding environment is reduced.

Figure 12:
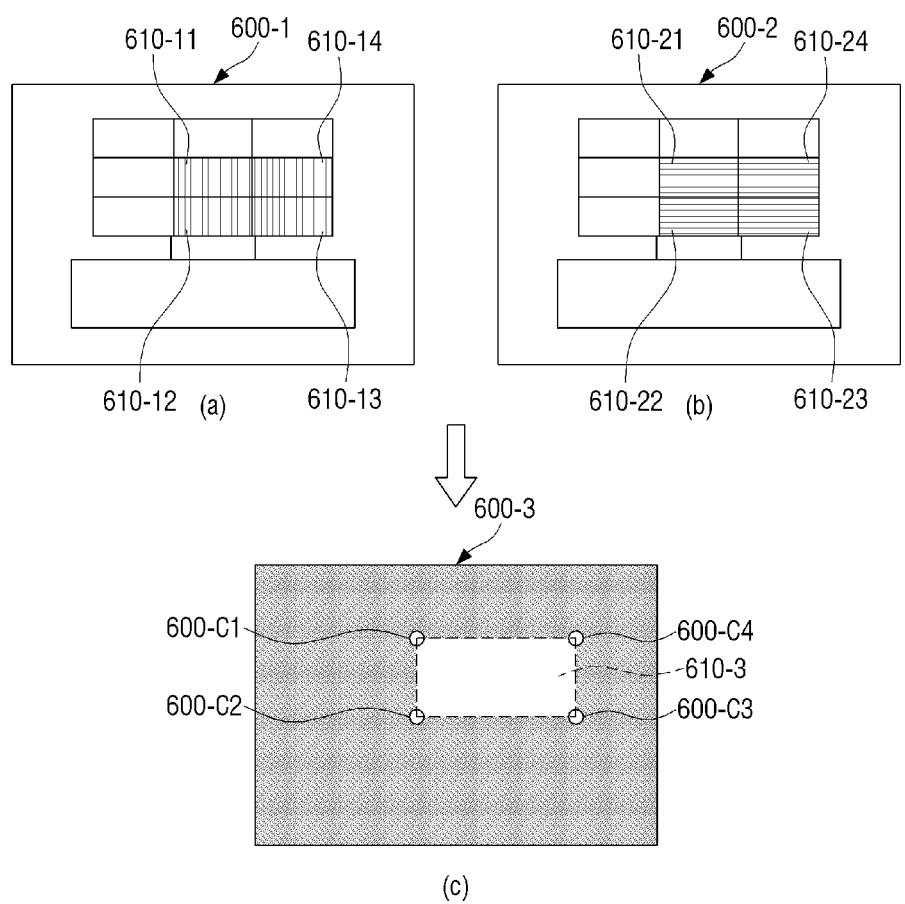
FIGS. 12 to 14 illustrate a process of detecting a ROI according to various exemplary embodiments.
Figure 13:
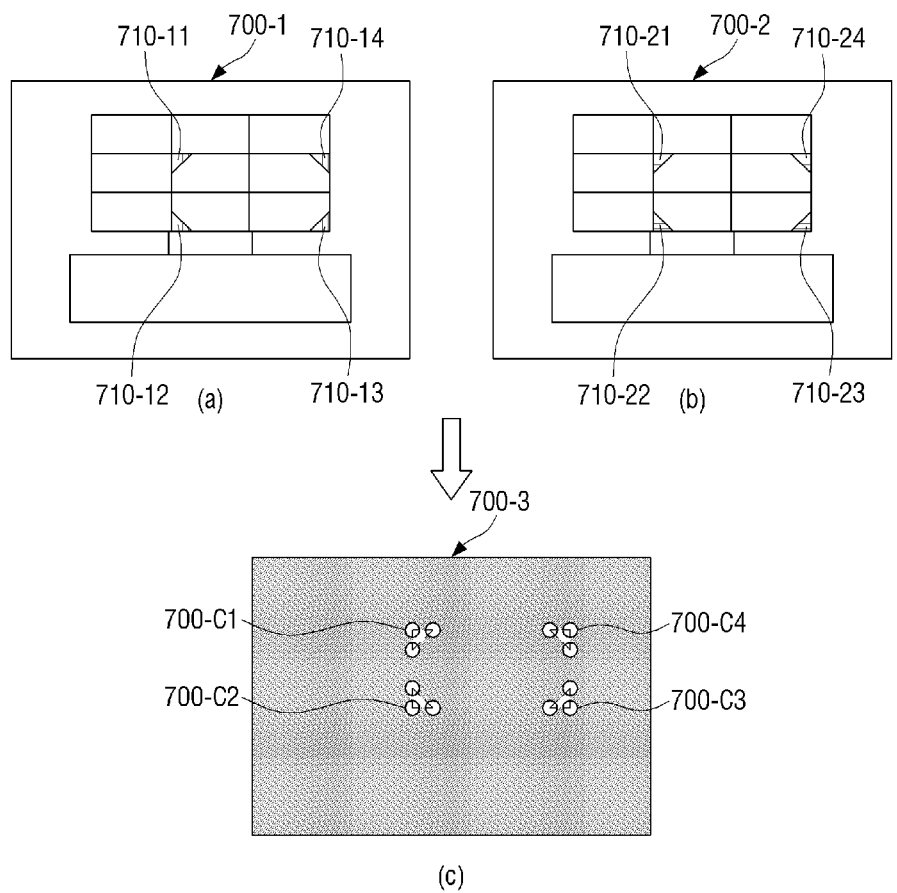
Figure 14:
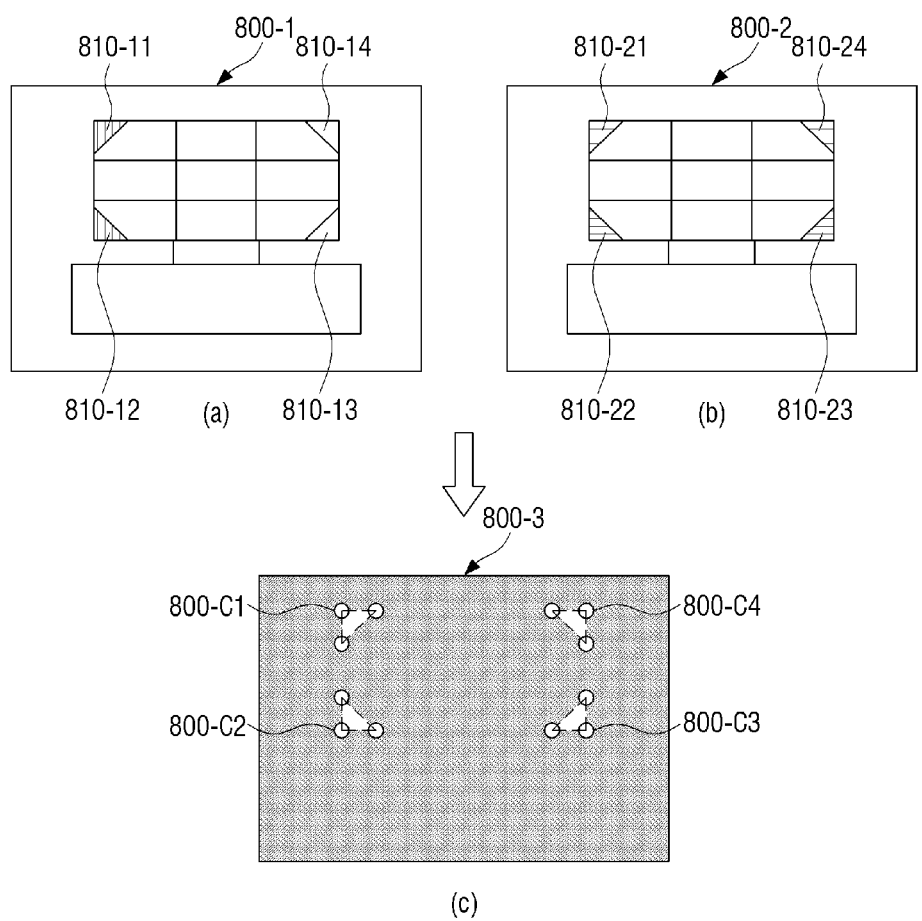

FIGS. 12 to 14 illustrate a process of detecting a ROI according to a variety of examples of an exemplary embodiment.

Referring to FIG. 12, the display apparatus may include a plurality of display panels, and the controller 120 may control so that at least some of the plurality of displays panels may exclusively display mono-color images. That is, the controller 120 may control the image processor 150 to generate a plurality of mono-color images that correspond to at least some of the plurality of display panels.

FIG. 12(a) illustrates a first test image 600-1 which is a photographed image of a display apparatus displaying thereon a first mono-color image. The first mono-color image is displayed on only four adjacent display panels 610-11~610-14 among the nine display panels. Accordingly, the regions of the first test image 600-1 that correspond to the display panels may include a first mono-color image which is displayable only on four adjacent display panels 610-11~610-14.

FIG. 12(b) illustrates a second test image 600-2 which is a photographed image of a display apparatus displaying thereon a second mono-color image. The second mono-color image is displayed on only four adjacent display panels 610-21~610-24 among the nine display panels. Accordingly, the regions of the second test image 600-2 that correspond to the display panels may include a second mono-color image which is displayable only on four adjacent display panels 610-21~610-24.

FIG. 12(c) illustrates a resultant image which is obtained as a result of computing gray levels of the first and second test images 600-1, 600-2 based on pixel units. Considering that the four adjacent display panels displaying mono-color images correspond to one integrated display panel of four display panels, the method for detecting a target region of the resultant image 600-3 and the method for detecting a plurality of corner points 600-C1~600-C4 from the detected target region are identical to those explained above with reference to FIGS. 6 to 7. Accordingly, the controller 120 may detect the ROI 610-3 which is a space defined within the first to fourth detected corner points 600-C1~600-C4.

Accordingly, the ROI detecting apparatus 100-A can detect the ROI with respect to even some of a plurality of display panels.

Referring to FIG. 13, the display apparatus includes a plurality of display panels, and the controller 120 may control so that mono-color image is displayed exclusively on at least some of the plurality of display panels. The controller 120 may control so that the mono-color image is displayed exclusively on the respective adjacent corner regions of the display screen. In this example, the adjacent corner regions of the display screen may be in a triangular shape, and the respective corner regions may sequentially display the first and second mono-color images. Accordingly, the controller 120 may control the image processor 150 to generate a plurality of mono-color images to be exclusively displayed on the respective corner regions of the entire display screen, in which the corner regions are formed by at least two successively arranged display panels among the plurality of display panels.

FIG. 13(*a*) illustrates a first test image 700-1 which is a photographed image of a display apparatus displaying thereon a first mono-color image. The first mono-color image is displayed on only the respective corner regions 710-11~710-14 of the entire display screen constituted by the four adjacent display panels among the nine display panels. Accordingly, the regions of the first test image 700-1 that correspond to the display panels may include a first mono-color image which is displayable only on four adjacent display panels.

FIG. 13(*b*) illustrates a second test image 700-2 which is a photographed image of a display apparatus displaying thereon a second mono-color image. The second mono-color image is displayed on only the respective corner regions 710-21~710-24 of the entire display screen constituted by the four adjacent display panels among the nine display panels. Accordingly, the regions of the second test image 700-2 that correspond to the display panels may include a second mono-color image which is displayable only on four adjacent display panels.

FIG. 13(*c*) illustrates a resultant image which is obtained as a result of computing gray levels of the first and second test images 700-1, 700-2 based on pixel units. Considering that the four adjacent display panels displaying mono-color image correspond to one integrated display panel of four display panels, the method for detecting a target region of the resultant image 700-3 and the method for detecting a plurality of corner points 700-C1~700-C4 from the detected target region are identical to those explained above with reference to FIGS. 8 to 11. Accordingly, the controller 120 may detect the ROI which is a space defined within the first to fourth detected corner points 700-C1~700-C4.

Referring to FIG. 14, the display apparatus includes a plurality of display panels, and the controller 120 may control so that a mono-color image is displayed exclusively on at least some of the plurality of display panels. The controller 120 may control so that the mono-color image is displayed exclusively on a plurality of discontinuously-arranged corner regions of the display screen. In this example, the adjacent corner regions of the display screen may be in a triangular shape, and the respective corner regions may sequentially display the first and second mono-color images. Accordingly, the controller 120 may control the image processor 150 to generate a plurality of mono-color images to be exclusively displayed on the corner regions of at least two discontinuously-arranged display panels of the plurality of display panels.

FIG. 14(*a*) illustrates a first test image 800-1 which is a photographed image of a display apparatus displaying thereon a first mono-color image. The first mono-color image is displayed on only the respective corner regions 810-11~810-14 of the entire display screen constituted by the four discontinuously-arranged display panels among the nine display panels. Accordingly, the regions of the first test image 800-1 that correspond to the display panels may include a first mono-color image which is displayable only on four discontinuously-arranged display panels.

FIG. 14(*b*) illustrates a second test image 800-2 which is a photographed image of a display apparatus displaying thereon a second mono-color image. The second mono-color image is displayed on only the respective corner regions 810-21~810-24 of the entire display screen constituted by the four discontinuously-arranged display panels among the nine display panels. Accordingly, the regions of the second test image 800-2 that correspond to the display panels may include a second mono-color image which is displayable only on four discontinuously-arranged display panels.

FIG. 14(*c*) illustrates a resultant image which is obtained as a result of computing gray levels of the first and second test images 800-1, 800-2 based on a change in pixel units. Considering that the four adjacent display panels displaying mono-color image correspond to one integrated display panel of four display panels, the method for detecting a target region of the resultant image 800-3 and the method for detecting a plurality of corner points 800-C1~800-C4 from the detected target region are identical to those explained above with reference to FIGS. 8A to 11. Accordingly, the controller 120 may detect the ROI which is a space defined within the first to fourth detected corner points 800-C1~800-C4.

Figure 15:
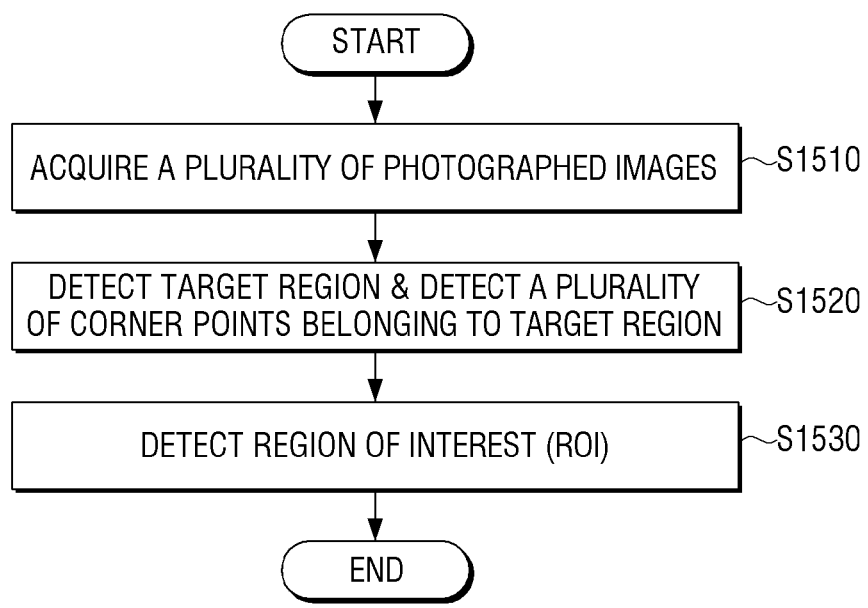
FIG. 15 is a flowchart provided to explain a method for detecting a ROI according to an exemplary embodiment.

FIG. 15 is a flowchart provided to explain a method for detecting a ROI according to an exemplary embodiment. In explaining the exemplary embodiment, the elements or operations overlapped with those explained above will not be redundantly explained for the sake of brevity.

The image processor 150 sequentially generates a plurality of mono-color images. After sequentially generating the plurality of mono-color images, the image processor 150 may transmit the plurality of mono-color images to the communicator 140, and the communicator 140 may transmit the plurality of mono-color images sequentially to the display apparatus. Accordingly, the display apparatus may display the first and second mono-color images sequentially.

The camera 130 may photograph the display apparatus and generate test images. Because the display apparatus displays the first and second mono-color images sequentially, the camera 130 may transmit the first and second test images sequentially to the input 110, in which the first and second test images are photographed images of the display apparatus sequentially displaying the first and second mono-color images. The input 110 sequentially receives the first and second test images which are successively photographed images.

Accordingly, at operation S1510, the ROI detecting apparatus 100-A photographs the display apparatus which sequentially displays a plurality of different mono-color images, and acquires a plurality of test images.

After that, the controller 120 may calculate gray levels of the respective test images which are sequentially received at the input 110. That is, the controller 120 may calculate a difference between the gray level of the first test image and the gray level of the second test image. As a result, the controller 120 may set a target region when a pixel region has a difference of gray levels above a preset value, while setting a background region when a pixel region has a difference of gray levels below a preset value. When the target region is detected, the controller 120 may detect corner points of the target region. The corner points may be detected by the Harris corner detection algorithm method, and there may be a plurality of corner points for one target region.

Accordingly, at operation S1520, the ROI detecting apparatus 100-A detects a target region by comparing the gray levels of the plurality of test images and detects a plurality of corner points of the target region.

After that, the controller 120 may detect a ROI based on the plurality of detected corner points. Because one target region may have a plurality of corner points, the controller 120 may connect the plurality of corner points and determine a ROI based on the space defined within the connected corner points.

Accordingly, at operation S1530, the ROI detecting apparatus 100-A detects the ROI corresponding to the display screen of the display apparatus, based on the plurality of corner points.

Figure 16:
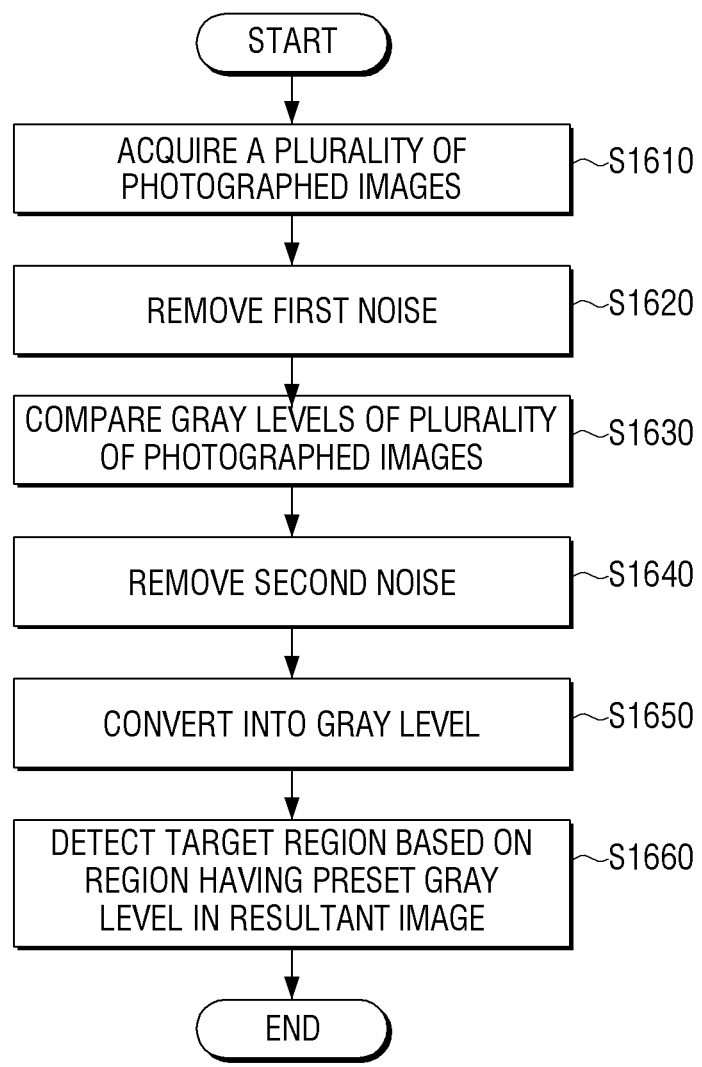
FIG. 16 is a flowchart provided to explain a method for detecting a ROI according to an exemplary embodiment.

FIG. 16 is a flowchart provided to explain a method for detecting a target region, according to an exemplary embodiment. In explaining the exemplary embodiment, the elements or operations overlapped with those explained above will not be redundantly explained for the sake of brevity.

At operation S1610, the controller 120 acquires a plurality of photographed images. The plurality of photographed images may be first and second test images.

After that, at operation S1620, the controller 120 may remove a first noise. The first noise may be a noise of an image signal which may appear between the first and second test images according to minute movement of the ROI detecting apparatus 100-A or a camera which photographs the display panel. That is, to maintain stability of an image, the controller 120 removes noise, according to which regions with similar pixels are smoothed and edges of the objects are maintained.

Accordingly, at operation S1630, the controller 120 may acquire the resultant image, free of the first noise, as a result of comparing the gray levels of the first and second test images. The resultant image may be obtained by comparing the gray levels of the plurality of test images and subtracting the gray levels of the plurality of test images based on changes in respective pixel units.

After that, at operation S1640, the controller 120 may remove a second noise. The second noise may be the noise of an image signal which may appear between the first and second test images due to abrupt change in the image on a non-display panel area. For the method for removing the second noise, reference may be made to the explanation provided above with regard to FIG. 6. Further, the method for distinguishing the color image region from the background region after removing the second noise, has also been explained above with reference to FIG. 6.

After that, at operation S1650, the controller 120 may convert the resultant image into gray levels. At operation S1660, the controller 120 may detect a target region when a preset gray level within the image is determined based on the gray levels converted therefrom. Hereinbelow, a method for detecting a ROI by detecting a plurality of corner points from the detected target region, will be explained.

Figure 17:
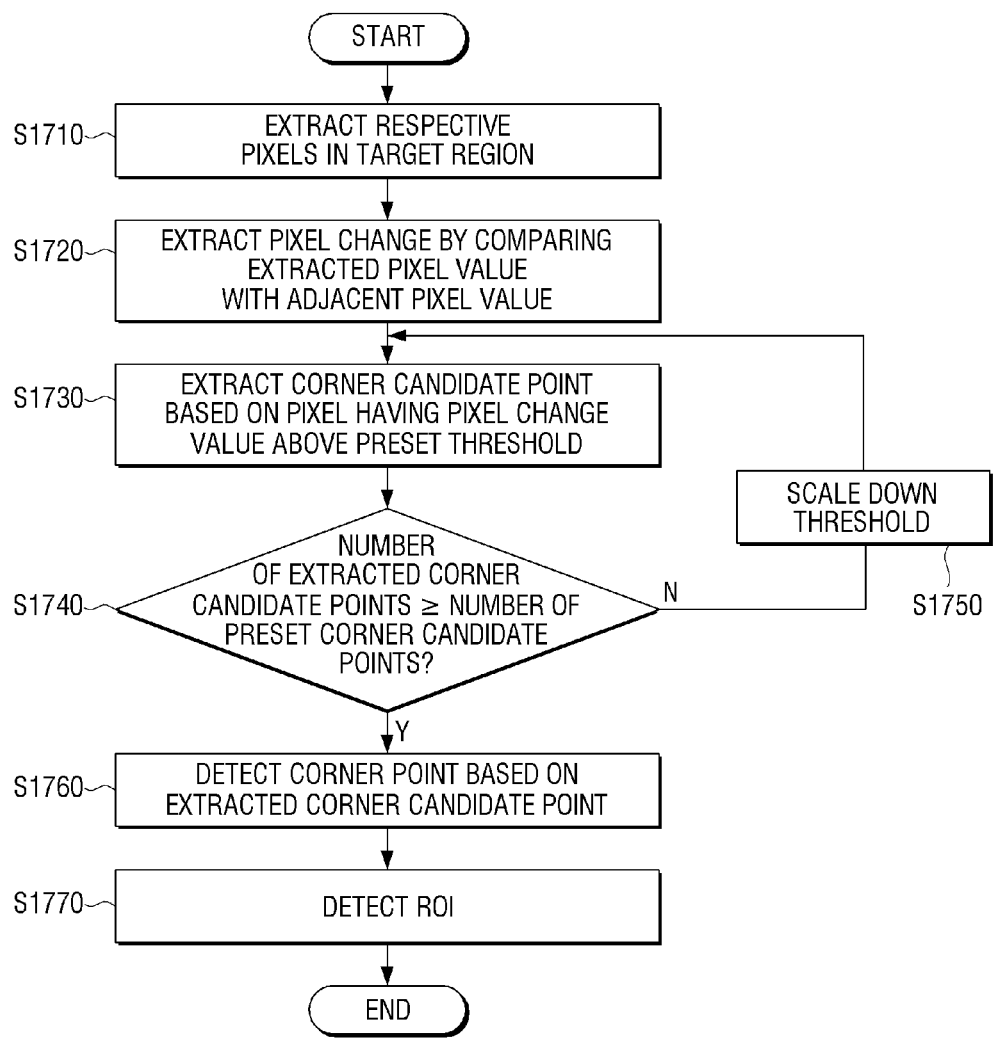
FIG. 17 is a flowchart provided to explain a method for detecting corner points according to an exemplary embodiment.

FIG. 17 is a flowchart provided to explain a method for detecting corner points according to an exemplary embodiment. In explaining the exemplary embodiment, the elements or operations overlapped with those explained above with reference to FIG. 7 will not be redundantly explained for the sake of brevity.

At operation S1710, the controller 120 extracts pixel values of respective pixels in the detected target region. After that, at operation S1720, the controller 120 compares the extracted pixel values of the respective pixels in the target region with the adjacent pixel values and extracts a pixel change.

After that, at operation S1730, the controller 120 extracts a corner candidate point, based on a pixel that has a pixel change exceeding a preset threshold. When the extracted pixel change exceeds the corner threshold, the controller 120 determines the corresponding pixels to be the corner candidate points. When the extracted pixel change does not exceed the corner threshold, the controller 120 determines that the corresponding pixels are not corner candidate points.

Accordingly, the controller 120 detects the corner candidate points, and calculates a number of corner candidate points as detected. At operation S1740, the controller 120 thus determines whether the number of extracted corner candidate points exceeds the preset number of corner candidate points. At operation 1740_Y, when the number of extracted corner candidate points exceeds the preset number of corner candidate points, at S1760, the controller 120 detects the extracted corner candidate points to be the corner points. The method of detecting the corner points with the corner candidate points has been explained above and will not be redundantly explained for the sake of brevity.

At operation S1740_N, when the number of extracted corner candidate points does not exceed the preset number of corner candidate points, at S1750, the controller 120 scales down the preset corner threshold. At operation S1730, the controller 120 compares the extracted pixel change with the scaled-down corner threshold, and extracts a corner candidate point, based on a pixel that has a pixel change exceeding the scaled-down threshold.

Accordingly, at operation S1760, the controller 120 detects the corner points with the extracted corner candidate points, and at operation S1770, the controller detects a ROI based on a space defined within the plurality of detected corner points by connecting the plurality of detected corner points.

The method according to various exemplary embodiments may be recorded on a non-transitory readable medium. The non-transitory readable medium may be loaded on a variety of devices to be used. In one example, a program code to execute a method including acquiring a plurality of photographed images by photographing a display apparatus, comparing gray levels of the plurality of photographed images and detecting a target region, detecting a plurality of corner points of the target region, and detecting a region of interest corresponding to a display screen of the display apparatus based on the plurality of corner points, may be stored on the non-transitory readable medium and provided.

The non-transitory readable medium refers to a device-readable medium which semi-permanently stores data, rather than a medium such as register, cache, or memory which stores data for a brief period of time. To be specific, the non-transitory readable medium may be, for example, CD, DVD, hard disk, blu-ray disk, USB, memory card or ROM.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims.

What is claimed is:

1. A method for detecting a region of interest (ROI), the method comprising:
   acquiring a plurality of test images by photographing a display apparatus which sequentially displays a plurality of different mono-color images;
   comparing gray levels of the plurality of test images, detecting a target region in the test images, and detecting a plurality of corner points of the target region; and
   detecting the ROI corresponding to a display screen of the display apparatus based on the plurality of corner points.

2. The method of claim 1, further comprising providing the plurality of mono-color images to the display apparatus in a sequential order.

3. The method of claim 2, wherein the display apparatus comprises at least one display panel, and the plurality of test images comprise a plurality of mono-color images to be displayed on respective corner regions of the display screen.

4. The method of claim 2, wherein the display apparatus is a multi-display system comprising a plurality of display panels, and the method for detecting the ROI further comprises generating the plurality of mono-color images that correspond to at least some of the plurality of display panels.

5. The method of claim 4, wherein the plurality of test images respectively comprise the plurality of mono-color images to be displayed on respective corner regions of the entire display screen which is formed by at least two continuously-arranged display panels among the plurality of display panels.

6. The method of claim 4, wherein the plurality of test images comprise the plurality of mono-color images to be displayed on the respective corner regions of the entire display screen which is formed by at least two discontinuously-arranged display panels among the plurality of display panels.

7. The method of claim 1, wherein the detecting the plurality of corner points comprises:

acquiring a resultant image by subtracting gray levels of the plurality of test images based on pixel values of the plurality of test images;

detecting the target region based on a region of the resultant image that has a preset gray level; and sequentially comparing the pixel values within the target region with pixel values of a region adjacent to the target region, and detecting the plurality of corner points based on areas of the target region and the adjacent region that have pixel value changes exceeding a corner threshold.

8. The method of claim 7, wherein the plurality of corner points are detected based on a Harris corner detection algorithm, and the detecting the plurality of corners comprises:

detecting a plurality of corner candidate points based on the areas of the target region and the adjacent region whose pixel value changes exceed the corner threshold; and detecting the plurality of corner points based on the plurality of detected corner candidate points, and wherein the detecting the plurality of corner candidate points comprises, scaling-down the corner threshold when the number of the plurality of detected corner candidate points does not exceed the preset number of corner candidate points.

9. The method of claim 1, further comprising:

determining a result of subtracting gray levels of the plurality of test images based on a plurality of gray level components and performing computation based on respective pixel values of the plurality of test images; and excluding pixel regions from the target region, when the pixel regions have a plurality of gray level components which are uniformly greater than 0 or smaller than 0 based on the result of the subtraction.

10. An apparatus for detecting a region of interest (ROI), the apparatus comprising:

an input configured to receive a plurality of test images of a display apparatus which sequentially displays a plurality of different mono-color images; and a controller configured to compare gray levels of the plurality of test images and detect a target region in the plurality of test images, and based on a plurality of corner points of the target region, detect the region of interest (ROI) corresponding to a display screen of the display apparatus.

11. The apparatus of claim 10, further comprising:

an image processor configured to generate the plurality of mono-color images; and a communicator configured to transmit the plurality of mono-color images to the display apparatus in a sequential order.

12. The apparatus of claim 11, further comprising a camera configured to photograph the display apparatus and generate the test images, wherein, after the plurality of mono-color images are transmitted to the display apparatus, the controller is configured to control the camera to photograph the plurality of mono-color images.

13. The apparatus of claim 11, wherein the display apparatus comprises at least one display panel, and the plurality of test images respectively comprise the plurality of mono-color images to be displayed on respective corner regions of the display screen.

14. The apparatus of claim 11, wherein the display apparatus is a multi-display system comprising a plurality of display panels, and the controller is configured to control the image processor to generate the plurality of mono-color images that correspond to at least some of the plurality of display panels.

15. The apparatus of claim 14, wherein the controller is configured to control the image processor to generate the plurality of mono-color images to be transmitted to the display apparatus to be displayed on respective corner regions of the entire display screen which is formed by at least two continuously-arranged display panels among the plurality of display panels.

16. The apparatus of claim 14, wherein the controller is configured to control the image processor to generate the plurality of mono-color images to be displayed on respective corner regions of the entire display screen which is formed by at least two discontinuously-arranged display panels among the plurality of display panels.

17. The apparatus of claim 10, wherein the controller is configured to acquire a resultant image by subtracting gray levels of the plurality of test images based on pixel values of the plurality of test images, detect the target region based on a region of the resultant image that has a preset gray level, and sequentially compare respective pixel values within the target region with pixel values of a region adjacent to the target region, and detect the plurality of corner points based on areas of the target region and areas of the adjacent region that have pixel value changes exceeding a corner threshold.

18. The apparatus of claim 17, wherein the plurality of corner points are detected based on a Harris corner detection algorithm, and the controller is configured to detect a plurality of corner candidate points based on the areas of the target region and the areas of the adjacent region whose pixel value changes exceed the corner threshold, detect the plurality of corner points based on the plurality of detected corner candidate points, and scale-down the corner threshold, when the number of the plurality of detected corner candidate points does not exceed a preset number of corner candidate points.

19. The apparatus of claim 10, wherein the controller is configured to determine a result of subtracting gray levels of the plurality of test images based on a plurality of gray level components and perform computation based on respective pixel units of the plurality of test images, and exclude pixel regions from the target region when the pixel regions have plurality of gray level components which are uniformly greater than 0 or smaller than 0 based on the result of the subtraction.

20. A method of detecting a region of interest (ROI) in photographed images, the method comprising:
- photographing a first mono-color image displayed on the display apparatus to acquire a first test image;
- sequentially photographing a second mono-color image displayed on the display apparatus to acquire a second test image;
- obtaining a target region by computing differences between gray levels of the first test image and gray levels of the second test image;
- detecting a plurality of corner points of the target region, and
- detecting the ROI based on the plurality of detected corner points.

* * * * *